Figures 1, 3:
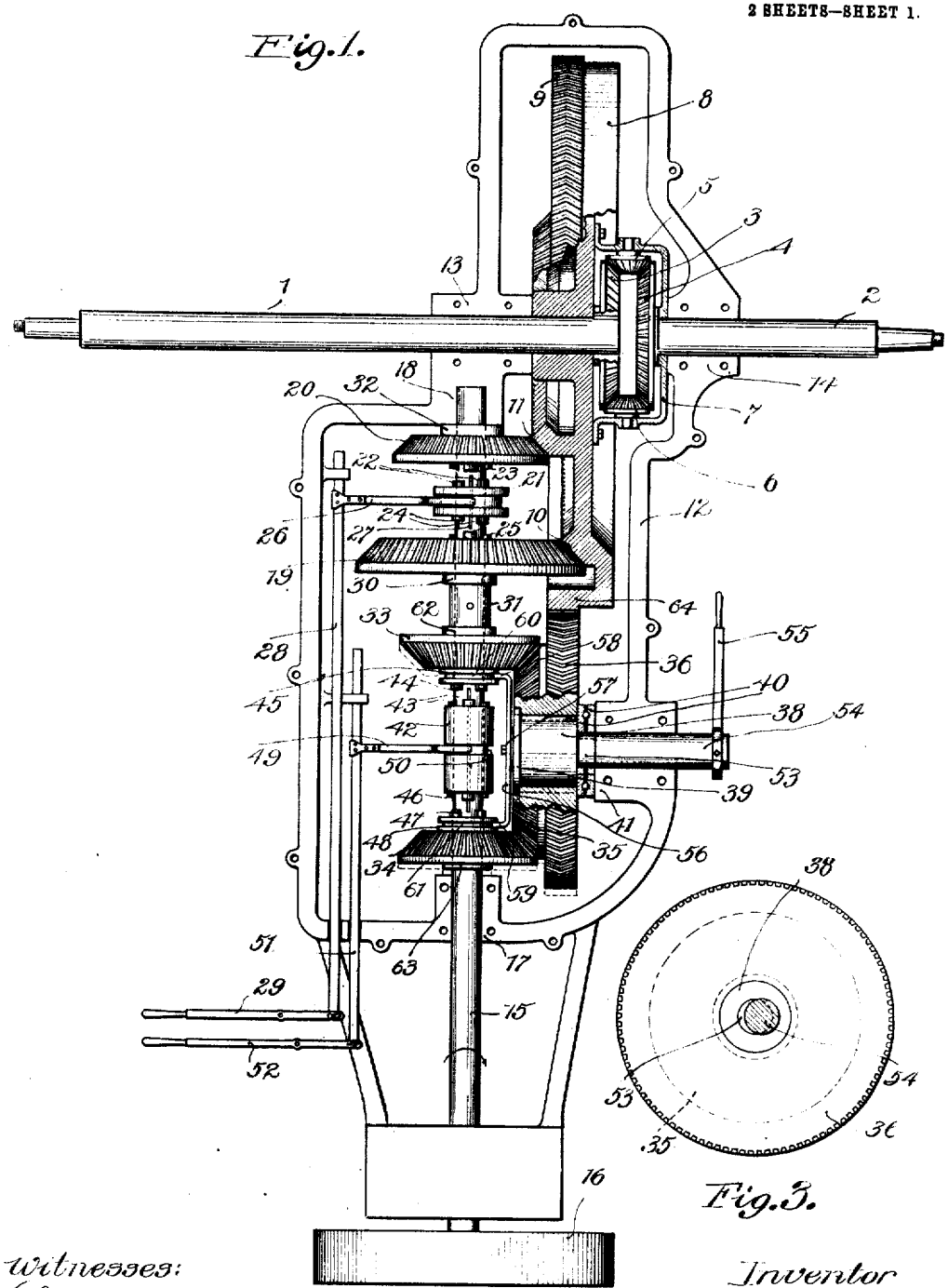

J. SCHLIG.
TRANSMISSION GEARING.
APPLICATION FILED MAR. 17, 1906.

No. 907,181.

Patented Dec. 22, 1908.
2 SHEETS—SHEET 1.

Witnesses:
Leonard W. Novander.
Charles J. Schmidt.

Inventor
John Schlig
By Charles A. Brown
Attorney

J. SCHLIG.
TRANSMISSION GEARING.
APPLICATION FILED MAR. 17, 1908.

907,181.

Patented Dec. 22, 1908.
2 SHEETS—SHEET 2.

Witnesses:
Leonard W. Novander.
Charles J. Schmiat.

Inventor
John Schlig
By Charles A. Brew
Attorney

UNITED STATES PATENT OFFICE.

JOHN SCHLIG, OF CHICAGO, ILLINOIS, ASSIGNOR TO SCHLIG'S DIRECT DRIVE, OF CHICAGO, ILLINOIS, A CORPORATION OF ILLINOIS.

TRANSMISSION-GEARING.

No. 907,181.　　　　Specification of Letters Patent.　　　　Patented Dec. 22, 1908.

Application filed March 17, 1906. Serial No. 306,634.

*To all whom it may concern:*

Be it known that I, JOHN SCHLIG, a citizen of the United States, residing at Chicago, in the county of Cook and State of Illinois, have invented a certain new and useful Improvement in Transmission-Gearing, of which the following is a full, clear, concise, and exact description, reference being had to the accompanying drawings, forming a part of this specification.

My invention relates to transmission gearing mechanism, particularly to gearing mechanism for vehicles such as automobiles or the like, the object of my invention being to produce gearing mechanism which is less complicated, less expensive and more efficient than mechanism for this class heretofore used.

In self-propelled vehicles, such as automobiles, for instance, the gearing mechanism connecting the driving engine with the shaft must be arranged to transmit several forward speeds, usually three, namely, slow speed, intermediate speed and full speed, and provision must also be made for reverse driving usually of one speed which is comparatively slow. Heretofore, to obtain such speed relations complicated gearing mechanism was necessary, involving complicated counter shafting and gears. In these mechanisms also driving gears are brought directly into engagement with gears to be driven, and the teeth being usually very small and comparatively weak, the result was that the teeth would become more or less stripped from the gear body and the gears soon became too mutilated for efficient use. During the throwing-in operation also there is considerable noise.

The object of my invention, therefore, is to greatly simplify the transmission gearing arrangement and to provide means for overcoming the noise, and these features I obtain by using only a single driving shaft upon which are mounted the various driving gears for association with the main gear connected with the axle or shaft to be driven. These driving gears are loosely mounted on the driving shaft and unless effective in driving the main gear they rotate idly on the driving shaft. Clutch mechanism or collars are arranged to be slidable on the driving shaft but to rotate therewith, and upon rotation of suitable levers the clutch collars are moved to connect any desired gear in driving relation with the driving axle. The clutch teeth of the clutch collars and the companion teeth on the driving gears may be made very much heavier and stronger than the gear teeth, the stripping of the gear teeth heretofore experienced being therefore eliminated. These clutch mechanisms may also be constructed to engage the driving gears with very little noise.

My invention will be better understood by reference to the accompanying drawings, in which—

Figure 2:
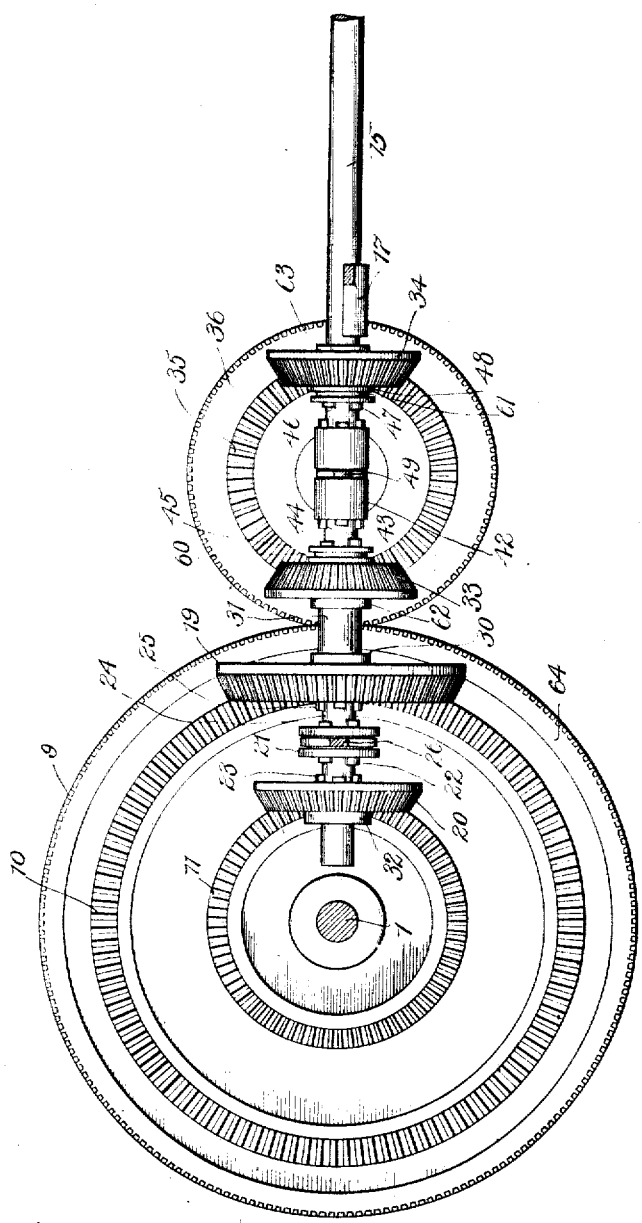

Figure 1 is a plan view of the transmission gearing of my invention associated with a shaft or axle to be driven and a driving source, the top half of the inclosing casing being removed and part of the gearing mechanism being shown in section. Fig. 2 is a side elevation from the left of the transmission gearing and main gear throw, the casing and driving source being removed, and Fig. 3 is an elevation view from the right of an intermediate gear showing arrangement of eccentric mechanism for throwing this intermediate gear into and out of meshing engagement with the main gear.

I have shown my invention applied to a vehicle such as an automobile, and, as is usual, the driving axle is in two parts 1 and 2 terminating, respectively, in bevel gears 3 and 4 for forming part of well known differential mechanism. Bevel pinions 5 and 6 engage both gears 3 and 4 and are pivoted in the frame 7 secured to the main driving gear 8 which is loosely pivoted on the part 1 of the axle. This main gear is of novel construction and has the three gearing surfaces 9, 10 and 11, the gearing surface 9 being preferably of the herringbone type, while the surfaces 10 and 11 are beveled. The casing or housing 12 surrounds the main gear and differential mechanism and also all the other gearing parts, the bearings 13 and 14 receiving the parts 1 and 2, respectively, of the axle, the main gear 8 and a differential casing being disposed between these bearings. Extending forwardly from the driving axle and at right angles thereto is the driving shaft 15 driven from the engine 16 of any suitable design. This driving shaft passes through and journals in the bearings 17 and 18 supported by the inclosing casing. Normally loosely pivoted on the driving shaft 15 and in mesh with the gearing surfaces 10 and 11, respectively, are the bevel gears 19 and 20 and between these gears is disposed the clutch collar 21. This collar is keyed to rotate with the shaft 15 but may slide longitudinally thereon, being provided at one face by the teeth 22 for clutching engagement with teeth 23 extending from the gear 20, and on its other face being provided with teeth 24 for clutching engagement with the teeth 25 extending from the gear 19. A forked clutch lever 26 engaging in the slot 27 of the clutch collar connects through rod 28 with a controlling lever 29. Upon oscillation of this controlling lever the clutch collar will be moved to connect the driving shaft either with the gear 19 or the gear 20, the gear 19 being designed to produce an intermediary forward speed of the driving axle and the gear 20 being designed to produce the highest speed of the axle. The thrust of the clutch collar against the gear 19 is counteracted by a thrust bearing 30 of suitable design which abuts against a collar 31 secured to the shaft, and the thrust of the clutch collar against the gear 20 is counteracted by a thrust bearing 32 abutting against the frame on the bearing 18.

Loosely pivoted at the forward end of the shaft 15 are the forward and reverse low speed gears 33 and 34, respectively, both in mesh with the bevel gear 35 extending from the side of the intermediary gear 36 whose gearing surface is adapted for meshing engagement with the gearing surface 9 of the main gear. The gear structure comprising the intermediary gear 36 and the bevel gear 35 is mounted on the hub 38, being confined between the flange 39 on said hub and the bearing 40 resting against the bearing frame 41.

The clutch collar 42 is keyed to the driving shaft 15 but is adapted for lateral movement thereon between the gears 33 and 34. This collar on one face has teeth 43 for engagement with clutch teeth 44 extending from the hub 45 of the gear 33 and at its other face has teeth 46 for engaging with the clutch teeth 47 extending from the hub 48 of the gear 34. The forked lever 49 engages in the slot 50 of the clutch collar and through connecting rod 51 connects with the controlling lever 52. Upon actuation of this controlling lever 52 in one direction the clutch collar will be moved to connect the shaft 15 in driving relation with the forward gear 33 whereby the gears 35 and 36 will be driven to cause forward rotation of the main gear 8. When the lever 52 is moved in the other direction the clutch collar 42 connects the shaft 15 in driving relation with the gear 34 and the gears 35 and 36 are driven in the opposite direction to cause reverse rotation of the main gear 8. It is desirable, however, to disconnect the slow speed mechanism just described from the main gear 8 when the gears 19 and 20 are in use, and suitable mechanism is provided for controlling the connection of this mechanism with the main driving gear. Although many ways may be employed for carrying this out, I have shown eccentric mechanism, best illustrated in Figs. 1 and 3. The hub 38 is supported on the crank arm comprising the eccentric sections 53 and 54, the section 53 between the bearing and the hub being concentric with the hub, the section 54 being journaled in the bearing 41. By means of a lever 55 the shaft 54 may be rotated within the bearing 41 a sufficient arc to cause the hub to be moved away from the main gear 8 to withdraw the gear 36 from meshing relation with the gear surface 9. The gears 33 and 34 should, however, remain in meshing engagement with the gear section 35, and this is accomplished by means of a yoke or connecting rod 56 secured at 57 to the hub 38 and engaging at its ends 58 and 59 in the annular grooves 60 and 61 cut in the hubs of the gears 33 and 34, respectively. Thus, upon rotation of the lever 55 the gears 33, 34, 35 and 36 will move together with the hub 38 and will maintain their meshing relation. In Fig. 1 the gear 36 meshes with the main gear and upon moving the clutch collar 42 rearwardly, forward rotation of the main gear will result, the thrust of the clutch collars against the gear 33 being received by the thrust bearing 62 abutting against the collar 31. When the clutch collar 42 is moved forwardly it comes into clutching engagement with the reverse gear 34 and reverse rotation of the main gear will result, the thrust of the clutch collar being taken up by the connecting rod or frame 56.

It will be seen that the gearing surface 9 and that of the gear 36 are the only gearing surfaces which are moved into and out of mesh, but this is usually done only when the vehicle is at rest and therefore there will be no excessive strain at any time on the teeth of these gears. The other gears, however, are always in meshing relation, those not in use rotating idly while the gear to be used has been connected into driving relation with the driving shaft 15. The clutch teeth extending from the driving gears and from the clutch collars can be made very much stronger than the gearing teeth and will, therefore, take up the clutching strains which heretofore have been taken up by the gearing teeth themselves, resulting, as before stated, in the mutilation of the gearing teeth or stripping thereof from the gear body. Alternate clutch teeth may also be made shorter whereby they will much more readily come into engagement and the noise during the clutch operation will be greatly reduced.

The main gear 8 is preferably constructed as shown, the outer rim 64 overhanging the bevel gear surface 10 and part of the gear surface 11, these surfaces being, therefore, protected. This rim also partly overhangs the differential mechanism connected with the axle and a very neat and compact arrangement is, therefore, provided. The engine drives the shaft 15 in the direction indicated by the arrow, and if it is desired to start with slow speed, lever 52 is actuated to throw in a forward gear 33 and the gear 36 which is normally in mesh with the main gear causes forward rotation of this main gear. Ordinarily, however, where the road is more or less level the vehicle is started directly from the intermediate gears 19, the gear 36 being first thrown out of commission by actuation of the lever 55. After sufficient headway has been made with the gear 19 the high speed gear 20 is thrown in by reverse movement of the lever 28 and there are thus three speeds ahead for the vehicle. If it is desired to back up, the lever 55 is moved to throw in the gear 36 and the lever 52 actuated to throw in the reverse gear 34, whereupon the vehicle will travel backwards under slow speed. The single shaft 15 suffices for all these directions and speeds, the arrangement being very much more simple and efficient than arrangements now in use in which complicated counter shafting and gearing are necessary for obtaining the same control. By means of the housing, which offers bearing for the gear parts and which is also connected with the engine frame, a very rigid supporting framework for the vehicle driving outfit is provided. I do not wish to be limited, however, to the exact arrangement and construction of the parts as shown, as changes may readily be made therein without departing from the scope and spirit of my invention.

I desire to secure the following claims:

1. In combination, an axle or shaft to be driven, a main gear mounted on said axle or shaft, a single driving shaft disposed at an angle with said shaft or axle to be driven and being continuously rotated only in one direction, and forward and reverse gear mechanism comprising gears always in mesh with each other and adapted to be associated with the main gear at one side of its axis and to be driven from said single shaft to cause either forward or reverse rotation of the main gear.

2. In a system of transmission gearing, the combination with a main gear to be driven, said main gear having a plurality of gearing surfaces, a driving gear connected with each of said surfaces, a driving shaft, forward and reverse gearing mechanism mounted on said driving shaft and connected with one of said driving gears, said other driving gears being adapted for direct connection with said main gear, and means for connecting said driving shaft in driving relation independently with any one of said driving gears.

3. In a system of transmission gearing, the combination with a main gear to be driven, of a driving shaft, a plurality of driving gears pivoted on said driving shaft, an intermediate gear adapted for gearing relation with one gearing surface on said main gear and connected with two of the driving gears of the driving shaft, the other driving gears of the driving shaft being in engagement with other gearing surfaces on the main gear, and clutch mechanism for independently connecting any one of said driving gears in driving relation with said shaft.

4. In a system of transmission gearing, the combination with a main gear to be driven, said main gear having a plurality of gearing surfaces of different diameter, a driving shaft, driving gears on said shaft connected with corresponding gear surfaces on said main gear, an intermediary gear engaging another surface on said main gear, another driving gear on said driving shaft connected with said intermediary gear, and clutching mechanism for connecting any one of the driving gears with the driving shaft whereby said main gear may be directly driven at various speeds from the driving shaft or indirectly driven through the intermediary gear.

5. In a system of transmission gearing, the combination with a main gear to be driven, said main gear having a plurality of gearing surfaces of different diameter, a driving shaft, driving gears on said shaft connected with corresponding gear surfaces on said main gear, an intermediary gear engaging another surface on said main gear, another driving gear on said driving shaft connected with said intermediary gear, clutching mechanism for connecting any one of the driving gears with the driving shaft whereby said main gear may be directly driven at various speeds from the driving shaft or indirectly driven through the intermediary gear, and means for moving said intermediary gear into and out of meshing relation with the main gear.

6. In a system of transmission gearing, the combination with a main gear to be driven, said main gear having a plurality of gearing surfaces, a driving shaft, driving gears on said shaft for direct connection with gearing surfaces on said main gear, an intermediary gear connected with another surface of said main gear, forward and reverse driving gears on said driving shaft for connection with said intermediary gear, and clutching mechanism for connecting any one of said driving gears with the driving shaft whereby said main gear may be driven directly or indirectly either in a forward or reverse direction through the intermediary gear.

7. In a system of transmission gearing, the combination with a main gear to be driven, said main gear having a plurality of gearing surfaces, a driving shaft, driving gears on said shaft for direct connection with gearing surfaces on said main gear, an intermediary gear connected with another surface of said main gear, forward and reverse driving gears on said driving shaft for connection with said intermediary gear, clutching mechanism for connecting any one of said driving gears with the driving shaft whereby said main gear may be driven directly or indirectly either in a forward or reverse direction through the intermediary gear, and means for connecting and disconnecting the intermediary gear from the main gear.

8. In a system of transmission gearing the combination of a main gear to be driven, said main gear having a plurality of gearing surfaces of different diameter, a driving shaft, a driving gear of one diameter on said driving shaft in engagement with one of the gearing surfaces, a second driving gear of another diameter on said driving shaft in engagement with another gearing surface, forward and reverse driving gears on said driving shaft, intermediate gears connecting said forward and reverse driving gears with another gearing surface on the main gear, and clutch mechanism for causing any one of the driving gears to become effective to cause a corresponding rotation of the main gear.

9. In combination, an axle to be driven, a single driving shaft disposed in the same plane with said axle and at right angles thereto, said driving shaft being driven only in one direction, a main gear mounted on the axle, and a plurality of gears always in mesh with each other and adapted for direct connection with the main gear at one side of its axis and being adapted for connection with the single driving shaft to cause forward or reverse rotation of the main gear.

10. In a system of transmission gearing the combination of a main gear to be driven, of a driving shaft at right angles to the axis of the gear, said main gear having a plurality of gearing surfaces of different diameter, a high speed driving gear on said driving shaft for engaging one of the gearing surfaces, an intermediate speed driving gear on the driving shaft engaging another surface of the main gear, intermediary gearing mechanism connected with a third surface of the main gear, a forward slow speed driving gear on the driving shaft engaging the intermediary mechanism, a reverse driving gear on the driving shaft engaging the intermediary mechanism, and means for causing any one of the driving gears to be driven by the driving shaft to cause corresponding rotation of the main gear.

11. In a system of transmission gearing the combination of a main gear to be driven, of a driving shaft at right angles to the axis of the gear, said main gear having a plurality of gearing surfaces of different diameter, a high speed driving gear on said driving shaft for engaging one of the gearing surfaces, an intermediate speed driving gear on the driving shaft engaging another surface of the main gear, intermediary gearing mechanism connected with a third surface of the main gear, a forward slow speed driving gear on the driving shaft engaging the intermediary mechanism, a reverse driving gear on the driving shaft engaging the intermediary mechanism, and means for causing any one of the driving gears to be driven by the driving shaft to cause corresponding rotation of the main gear, said driving gears rotating all in the same direction.

12. In a system of transmission gearing, the combination with a main gear to be driven, of a driving shaft at right angles to the axis of the gear, said main gear having a plurality of gear surfaces of different diameter, a driving gear on said driving shaft for engaging one of the gearing surfaces to cause high speed of the main gear, a second driving gear on the driving shaft engaging another surface on the main gear to cause intermediate speed thereof, intermediary gearing mechanism connected with a third surface on the main gear, a forward driving gear on the driving shaft for engaging the intermediary mechanism for causing forward slow speed of the main gear, a reverse driving gear on the driving shaft engaging the intermediary mechanism to cause reverse slow speed of the main gear, said gears on the driving shaft being normally loosely mounted thereon, and clutch mechanism for connecting any one of said driving gears to the driving shaft to rotate therewith to cause corresponding rotation of the main gear.

13. In a system of transmission gearing, the combination with a main gear to be driven, of a driving shaft at right angles to the axis of the gear, said main gear having a plurality of gear surfaces of different diameter, a driving gear on said driving shaft for engaging one of the gearing surfaces to cause high speed of the main gear, a second driving gear on the driving shaft engaging another surface on the main gear to cause intermediate speed thereof, intermediary gearing mechanism connected with a third surface on the main gear, a forward driving gear on the driving shaft for engaging the intermediary mechanism for causing forward slow speed of the main gear, a reverse driving gear on the driving shaft engaging the intermediary mechanism to cause reverse slow speed of the main gear, said driving shaft rotating always in one direction, and clutch mechanism for connecting any one of said gears with the shaft whereby corresponding rotation is caused of the main gear.

14. In a system of transmission gearing, the combination with a main gear to be driven, of a driving shaft at right angles to the axis of the gear, said main gear having a plurality of gear surfaces of different diameter, a driving gear on said driving shaft for engaging one of the gearing surfaces to cause high speed of the main gear, a second driving gear on the driving shaft engaging another surface on the main gear to cause intermediate speed thereof, intermediary gearing mechanism connected with a third surface on the main gear, a forward driving gear on the driving shaft for engaging the intermediary mechanism for causing forward slow speed of the main gear, a reverse driving gear on the driving shaft engaging the intermediary mechanism to cause reverse slow speed of the main gear, said gears being normally all in their meshing relations and said driving shaft being normally disconnected from the driving gears thereon, and clutch mechanism for connecting any one of said driving gears with the shaft to cause corresponding rotation of the main gear.

15. In a system of transmission gearing the combination with a main gear to be driven, of a driving shaft at right angles to the axis of the main gear, said main gear having a plurality of beveled gearing surfaces and a straight gearing surface, forward driving beveled gears on the driving shaft for engagement with the corresponding beveled gearing surfaces of the main gear, an intermediary gear engaging in said straight gearing surface, a reverse gear on said driving shaft for engaging the intermediary gear, and means for causing any driving gear to transmit the rotation of the driving shaft to the main gear.

16. In a system of transmission gearing, the combination with a main gear to be driven, of a driving shaft at right angles to the axis of said main gear, said main gear having a plurality of bevel gearing surfaces, bevel gears on said driving shaft, each of said gearing surfaces on the main gear being engaged by a bevel gear on the driving shaft, an intermediary gear for engagement with another gearing surface on said main gear, a bevel gearing surface on the intermediary gear engaged at diametrically opposite points by two of the bevel gears of the driving shaft, said driving shaft rotating in one direction and normally disconnected from the bevel gears thereon, and clutch mechanism for at will connecting said shaft with any one of said driving gears whereby said main gear may be given various speeds and may be caused to rotate in a forward or reverse direction.

17. In a system of transmission gearing, the combination with a main gear to be driven, of a driving shaft at right angles to the axis of the main gear, a plurality of forward driving beveled gears on the driving shaft, said main gear having a plurality of beveled gearing surfaces of different diameter, each engaged by one of the forward driving gears, said main gear having another gearing surface an intermediary gear for engaging therewith, a reverse gear on the driving shaft engaging said intermediary gear, means for clutching the driving shaft to any one of the driving gears, and means for at will unmeshing said intermediary gear from the main gear.

18. In a system of transmission gearing, the combination with an axle to be driven, of a main gear mounted on the axle, a driving shaft at right angles to the axis of the main gear, a set of driving gears on the driving shaft in gearing relation with the main gear, a second set of driving gears on the driving shaft, reverse gearing mechanism connected with the axle and with the second set of driving gears on the driving shaft, said driving shaft being rotatable in one direction only, and means for independently connecting said driving shaft with any one of the driving gears.

19. In a system of transmission gearing, the combination with a main gear to be driven, of a driving shaft at right angles to the axis of the main gear, said main gear having a plurality of gearing surfaces, a plurality of driving gears on the driving shaft in gearing relation with the gearing surfaces of the main gear, other driving gears on the main shaft, reverse gearing mechanism connected with the main gear and with said other driving gears on the driving shaft, said driving shaft being rotatable in one direction only, means for connecting said shaft with any one of the driving gears, and means for at will disengaging the reversing gearing mechanism from gearing connection with the main gear.

20. The combination with an axle or shaft to be driven, of a main gear mounted thereon, a single driving shaft rotating continuously in one direction, a set of gears on said single shaft connecting directly with the main gear, another set of gears on said single shaft, a transmission gear connecting with the gears of the second set and adapted for connection with the main gear, and clutching mechanism for bringing any gear into service whereby the main gear may be driven in a forward direction by a plurality of said gears, and in a reverse direction by one of said gears.

21. The combination with an axle or shaft to be driven, of a main gear mounted thereon a single driving shaft at right angles with the axle and rotating in one direction only, gears on said driving shaft in permanent gearing connection with the main gear, a pair of other gears on said single shaft, a transmission gear in permanent connection with the gears of the pair and adapted for connection at will with the main gear, and clutching means for connecting any one of said gears on the driving shaft to rotate therewith, the gears connecting directly with the main gear causing forward rotation thereof, one gear of the pair when connected to the shaft also causing forward rotation of the main gear, and connection of the other gear of the pair to the single shaft causing reverse rotation of the main gear.

22. The combination of the base, the driven shaft, the drive shaft arranged at an angle to the driven shaft, power-transmitting devices arranged one on the drive shaft and the other on the driven shaft, an eccentrically mounted rotary part, an intermediate power-transmitting device journaled on said rotary part and adapted to operatively connect said devices, and means for turning said rotary part in its bearings, substantially as described.

23. In combination, an axle to be driven, a main gear on said axle, a single driving shaft all at one side of the axle and at right angles thereto and rotating only in one direction, and driving gears controlled by said single driving shaft and adapted to be directly associated with the main gear to cause forward or reverse rotation of the main gear and axle.

24. A geared driving disk, a power shaft, free gears mounted thereon and meshing with the gears on said driving disk, a geared reverse pinion engaging said driving disk, a free gear mounted on said power shaft and meshing with the gear of said reverse pinion, collars on said power shaft adapted to maintain said free gears in mesh with the gears of said driving disk and reverse pinion and clutches slidably secured upon said power shaft between said free gears and adapted to positively engage the latter.

25. A driving disk having a geared periphery and a face provided with a plurality of concentric gears, a power shaft, a plurality of free gears mounted thereon and meshing with the concentric gears of said driving disk, a geared reverse pinion meshing with the peripheral gear of said driving disk, a free gear mounted on said power shaft and meshing with the gear of said reverse pinion, collars adapted to maintain said free gears in mesh with the concentric gears of said driving disk and the gear of said reverse pinion and a plurality of clutches rotating with and slidable upon said power shaft and adapted to positively engage said free gears.

26. A driving disk with a geared periphery and a plurality of concentrically arranged gears upon the face thereof, a power shaft, a plurality of free gears mounted thereon and meshing with the concentrically arranged gears of said driving disk, a reverse pinion geared to the periphery of said driving disk, a free gear mounted on said power shaft and geared to said reverse pinion, a plurality of clutches rotating with and slidable upon said power shaft and adapted to positively engage said free gears, and means for actuating said clutches.

27. A power shaft, a driving disk, means for varying the rate of rotation of the latter during a constant rate of revolution of the former, said means consisting of gears concentrically arranged upon the face of said driving disk, gears mounted freely upon said power shaft and meshing with the gears of the driving disk, collars secured to the power shaft and maintaining the free gears thereon in engagement with the driving disk, gears and clutches rotating with and slidable upon the power shaft and adapted to positively engage the free gears thereon, and means for reversing the direction of rotation of the driving disk, said means consisting of a gear upon the circumference of said driving disk, a free reverse gear upon the power shaft, a reverse pinion adapted to engage both driving disk and power shaft gears, collars upon the power shaft maintaining the free gear in position thereon, a clutch rotating with and slidable upon the power shaft and adapted to positively engage said free reverse gear, and means for actuating said clutches, both forward and reverse.

In witness whereof, I hereunto subscribe my name this 14th day of March A. D., 1906.

JOHN SCHLIG.

Witnesses:
CHARLES J. SCHMIDT,
LEONARD W. NOVANDER.